United States Patent [19]

Guest et al.

[11] Patent Number: 4,923,220
[45] Date of Patent: May 8, 1990

[54] TUBE COUPLINGS

[75] Inventors: John D. Guest, Maidenhead, United Kingdom; Bo Harde, Gothenberg, Sweden

[73] Assignee: John Guest Limited, Middlesex, United Kingdom

[21] Appl. No.: 327,311

[22] Filed: Mar. 22, 1989

[30] Foreign Application Priority Data

Mar. 25, 1988 [EP] European Pat. Off. ........ 88302709.6

[51] Int. Cl.⁵ .............................................. F16L 21/00
[52] U.S. Cl. ........................................ 285/39; 285/323
[58] Field of Search ................. 285/323, 39, 315, 921, 285/322

[56] References Cited

U.S. PATENT DOCUMENTS

| | | | |
|---|---|---|---|
| 2,108,265 | 2/1938 | Martin et al. | 285/39 X |
| 3,569,903 | 3/1971 | Brishka | 285/315 X |
| 3,909,046 | 9/1975 | Legris | 285/39 |
| 4,305,606 | 12/1981 | Legris | 285/323 X |
| 4,332,402 | 6/1982 | Shellhouse | 285/322 X |
| 4,451,069 | 5/1984 | Melone | 285/315 |
| 4,573,716 | 3/1986 | Guest | 285/323 |
| 4,606,783 | 8/1986 | Guest | 285/323 X |
| 4,645,246 | 2/1987 | Guest | 285/323 |
| 4,722,560 | 2/1988 | Guest | 285/323 |

FOREIGN PATENT DOCUMENTS

| | | |
|---|---|---|
| 255368 | 2/1988 | European Pat. Off. |
| 3314306 | 10/1984 | Fed. Rep. of Germany |
| 8505164 | 11/1985 | PCT Int'l Appl. |
| 2060106 | 4/1981 | United Kingdom ................ 285/315 |

2089455  6/1982  United Kingdom.

*Primary Examiner*—Thomas F. Callaghan
*Attorney, Agent, or Firm*—Albert L. Jeffers; Lawrence A. Steward

[57] ABSTRACT

The disclosures relates to a tube coupling (10) for a tube (11) having a body (12) with open ended throughway (13) to receive the tube and a collet (21) in the open end of the throughway having resilient arms (23) engaging a tapered cam surface (20) in the body to clamp the ends of the arms against a tube extending through the collet into the body to lock a tube in the body.

The body has a cylindrical outer surface and a cylindrical cover (30) encircles and is slidable along the body. One end of the cover has an end wall (32) extending across the end of the body opposite the open end of the throughway with an aperture (33) through which the tube extends. The other end of the cover has an internal annular projection (35) which snaps over the end of the cylindrical body to retain the cover on the body while permitting the cover to slide linearly along the body. The end wall of the cover is engagable with the collet where it projects from the open end of the throughway and by pressing the end wall of the cover towards the end of the coupling body, the collet is depressed into the body to hold the resilient arms away from the tapered cam surface in the coupling body and permit the tube (11) to be withdrawn. The arrangement is particularly useful for relatively small couplings utilized in confined spaces where manual depression of the projecting part of the collet from the end of the coupling body would be difficult.

4 Claims, 1 Drawing Sheet

U.S. Patent May 8, 1990 4,923,220
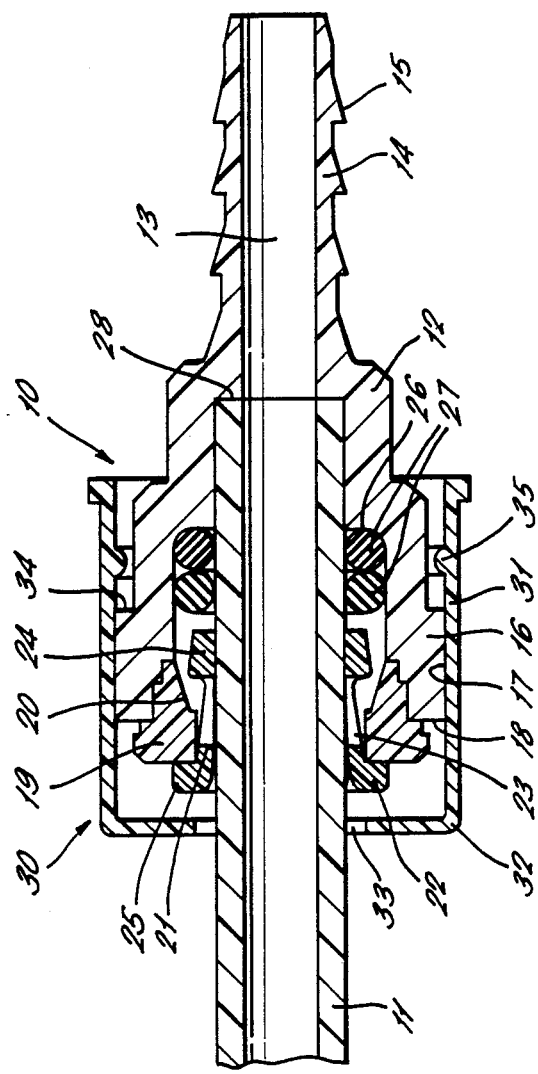

TUBE COUPLINGS

BACKGROUND OF THE INVENTION

This invention relates to tube couplings of the kind having a collet comprising a cylindrical portion with a cylindrical bore and with resilient arms extending axially from one end of said cylindrical portion and arranged to cooperate with a cam surface. The cam surface is constituted by a member surrounding the collet and having an internal surface tapering to a smaller diameter in one axial direction and engaging the arms so that the arms are forced radially inwardly by axial movement of the collet in said one direction to engage and lock a tube in the coupling. The collet may have a head at its outer end to facilitate locking and releasing of a tube in the coupling. It will be understood that operation of the collet head, particularly in the case of very small couplings for small diameter tubes in confined spaces, can cause difficulties and it is an object of the present invention to facilitate release of the collet when required.

SUMMARY OF THE INVENTION

This invention provides a tube coupling comprising a coupling body having a throughway opening at one end of the body, a collet having an annular portion extending into the throughway through said opening and resilient arms extending axially from the collet and projecting along the throughway in the body, a tapered cam surface in the throughway reducing towards said one end of the body and engaged by the resilient arms to compress the arms inwardly with movement of the collet towards said one end to grip and hold a tube extending into the throughway through the collet, a cover for the coupling body encircling the body and slidable along the body, the cover having an end wall facing said one end of the body with an aperture in the end wall through which a tube may pass into the coupling body and means acting between the cover and body to retain the cover on the body whilst permitting the cover to slide between a position in which the end wall is spaced clear of the collet projecting from the throughway and a position in which the end wall is engaged with the collet to depress the collet into the throughway and thereby release a tube from the coupling.

In one specific arrangement, the cover may comprise a sleeve slidable on the coupling body and having said end wall at one end thereof and being open at the other end thereof and the means to retain the cover on the coupling body comprise a projecting or projections adjacent said open end of the cover and engagable with an annular shoulder on the coupling body when the cover is drawn away from the coupling body to prevent detachment of the cover from the coupling body.

More particularly, the coupling body may have a cylindrical outer portion and the sleeve of the end cover is cylindrical to slide along the outer portion of the coupling body, the open end into the coupling body being provided at one end of the cylindrical portion and the annular shoulder being provided at the other end of the cylindrical portion.

In one preferred arrangement, the collet may have an annular head on the part of the collet disposed outside said throughway to be engaged by said end wall of the cover for release of the gripping action of the collet.

BRIEF DESCRIPTION OF THE DRAWING

The following is a description of a specific embodiment of the invention, reference being made to the accompanying drawing which a sectional view through a tube coupling.

DESCRIPTION OF THE PREFERRED EMBODIMENT

Referring to the drawing, there is shown a tube coupling indicated generally by the reference number 10 for a tube 11. The coupling comprises a body 12 having an open ended throughway 13 for the passage of a fluid. The body 12 comprises a nozzle portion 14 formed with encircling barb-shaped ridges 15 to engage in a flexible pipe and an enlarged head portion 16 having a cylindrical outer surface 17 and an end face 18.

The throughway 13 extends into the body through the end 18 and a moulded plastics insert 19 is secured around the open end of the body by ultrasonic welding. The insert 19 has an internal frusto-conical cam surface 20 tapering towards the open end of the body and a collet 21 for gripping a tube is located in the insert. The collet has an annular portion 22 from which resilient arms 23 extend axially into the head portion of the body. The arms have enlarged ends 24 the outer faces of which are engagable with the frusto-conical cam surface 20 to press the arms inwardly and the inner faces of which have hardened metal teeth (not shown) to engage the outer surface of the tube 11 to be gripped in the collet. The annular portion of the collet projecting outwardly from the insert 19 is formed with an out-turned flange 25 to facilitate gripping of the collet. The throughway 13 reduces in diameter at an annular step 26 spaced along the throughway from the insert 19 to a diameter just in excess of that of the tube 11 to be gripped in the coupling and a pair of O-ring seals 27 are mounted in the throughway adjacent the abutment 26 to form a seal between the throughway and tube. The throughway has a further reduction in diameter spaced along the throughway from the shoulder 26 forming second shoulder 28 which provides an end stop for the tube 11.

The tube is coupled in the body by inserting the tube into the body through the collet 22 until the end of the tube engages the shoulder 28. The enlarged ends of the resilient arms of the collect engage the tube and also the tapered cam surface 20 of the insert 19. Any movement of the tube outwardly of the coupling body is resisted by the engagement of the arms of the collet between the tapered cam surface 20 and the outer surface of the tube. In order to release a tube from the coupling body, the collet 22 is pressed into the body by pressing on the flange 25 which lies outwardly of the insert 19. With the flange 25 pressed against the insert 19, the enlarged ends of the resilient arms of the collet are released from the tapered cam surface and thus the gripping pressure of the arms on the tube is released. The tube can then be extracted from the body.

In order to protect the collet from inadvertent release and at the same time to facilitate release of the collet when it is desired to do so, particularly when the coupling is mounted in a confined space, a cover indicated generally at 30 is provided over the enlarged portion 16 of the coupling body. The cover comprises an outer cylindrical wall 31 engaging around the outer cylindrical surface 17 of the coupling body. The cover has an end wall 32 overlying the end of the coupling body and formed with an aperture 33 through which the tube 11 extends. The diameter of the aperture is such that a portion of the cover around the periphery of the aperture lies opposite the flange 25 at the end of the collet to be engagable therewith. The outer cylindrical surface 17 of the coupling body extends between end face 18 and an oppositely facing annular step 34 and the inner surface of the wall 31 of the cover is formed with an annular projection 35 which is a snap fit over the shoulder 34 to retain the cover on the body whilst permitting a limited axial sliding movement of the cover with respect to the body. The shoulder is positioned in the cover so that when the cover is snapped into position on the body, the end wall 32 of the cover is spaced clear from the head 25 of the collet to protect the collet against inadvertent release. However, the cover can be slid along the body to bring the end wall into engagement with the collet to press the collet into the coupling body and thereby allow the tube 11 to be released therefrom as described earlier. The sliding cover on the coupling body provides a particularly easy to operate device for the release of the collet.

We claim:

1. A tube coupling comprising a coupling body having a throughway opening at one end if the body, a collet having an annular portion formed with an encircling annular head disposed adjacent said one end of the body, the annular portion of the collet extending into the throughway through said opening and having resilient arms extending axially from the annular portion along the throughway, a tapered cam surface in the throughway reducing towards said one end of the body and engaged by the resilient arms to compress the arms inwardly with movement of the collet towards said one end to grip and hold a tube extending into the throughway through the collet, a cover encircling and detachably mounted on the coupling body for sliding movement along the body, the cover having an end wall facing said one end of the body and said annular head of the collet with an aperture in the end wall through which a tube may pass into the coupling body, the cover being slidable between a position in which the end wall is spaced clear of the collet head and a position in which the end wall engages the annular head of the collet to depress the collet into the throughway and thereby release a tube from the coupling, the cover having releasable retaining means holding the cover on the body which allows the cover to be detached from the body for direct operation of the collet.

2. A tube coupling as claimed in claim 1, wherein the cover comprises a sleeve slidable on the coupling body and having said end wall at one end thereof and being open at the other end thereof and the means to retain the cover on the coupling body comprise a projecting or projections adjacent said open end of the cover and engagable with an annular shoulder on the coupling body when the cover is drawn away from the coupling body to prevent detachment of the cover from the coupling body.

3. A tube coupling as claim in claim 2, wherein the coupling body has a cylindrical outer portion and the sleeve of the end cover is cylindrical to slide along the outer portion of the coupling body, the open end into the coupling body being provided at one end of the cylindrical portion and the annular shoulder being provided at the other end of the cylindrical portion.

4. A tube coupling as claimed in claim 1, wherein the collet has an annular head on the part of the collet disposed outside said throughway to be engaged by said end wall of the cover for release of the gripping action of the collet.

* * * * *